UNITED STATES PATENT OFFICE.

LOTHAR STERNBERG, OF BRUNSWICK, GERMANY, ASSIGNOR TO CARL UHL & CO., OF SAME PLACE.

PROCESS OF SEPARATING SUGAR FROM SACCHARINE FLUIDS.

SPECIFICATION forming part of Letters Patent No. 339,231, dated April 6, 1886.

Application filed December 21, 1885. Serial No. 186,366. (No specimens.)

*To all whom it may concern:*

Be it known that I, LOTHAR STERNBERG, of the town of Brunswick, in the Duchy of Brunswick and German Empire, have invented certain new and useful Improvements in Processes for Separating Sugar from Saccharine Fluids, of which the following is a specification.

This invention relates to an improved process for separating sugar from saccharine-fluids, or from fluids or semi-fluids containing sugar-crystals, and is based on the following hitherto unknown fact that if ammonia ($NH_3$) be added in excess or surplus to a solution of sugar saturated with quicklime or oxide of calcium, ($CaO$,) a precipitate is obtained consisting, chiefly, of a combination of sugar with lime—*i. e.*, a lime saccharate.

The precipitation of the sugar is the more perfect according to the amount of quicklime originally in solution—that is to say, the better the solution is saturated with lime the more sugar will be precipitated or separated out of the fluid. This precipitation or separation is facilitated by energetic stirring or shaking.

In order to render the precipitation or separation of the sugar from the non-saccharine matter as perfect as possible, an excess of the precipitant is necessary, so that the entire fluid will contain about ten to fifteen per cent. ammonia, ($NH_3$.) The precise chemical composition of the precipitate is of no importance to the present process; but it must be remarked that as a rule the same will contain two or three molecules of lime to one molecule of sugar.

In order to carry this present invention into effect, proceed as follows: A saccharine solution, (juice of plants, sirup, molasses, &c.,) which, if necessary, is so far diluted that it contains at the outside twelve per cent., or, what is best, about ten per cent. sugar, is, as is well known from the so-called "substitution process," or other process for obtaining the sugar from molasses, saturated with quicklime or oxide of calcium ($CaO$) in such manner that powdered lime in finely-divided form is continuously stirred into the solution until the same is fully saturated, (to one hundred parts sugar forty to sixty parts lime.)

It is a matter of course that the saturation can be effected in other manner—for instance by employing hydrate of lime in concentrated solution and subsequent dilution, &c.; but the above-mentioned method, by means of which the largest quantity of lime can be most readily dissolved, is decidedly to be preferred. By careful manipulation thirty to forty parts quicklime ($CaO$) are dissolved per one hundred parts sugar.

It will in most cases appear opportune to separate the surplus lime and the impurities contained in the same (such as silicic acid, oxide of iron, &c.) by means of suitable devices (filter-presses, &c.) from the solution; but it is not necessary.

The sugar solution which is saturated with lime is contained in appropriate vessels with stirring device, into which ammonia-gas is introduced while the stirring operation is continuously carried out. The precipitation will soon commence, will increase with the increase of ammonia introduced into the solution, and will be ended as soon as a sufficient quantity of ammonia has been absorbed. A fixed rule as to the quantity of ammonia to be employed cannot be given, as the same must be varied according to the nature of the saccharine fluid, the concentration of the same, the amount of lime contained in the fluid, &c., and must in each case be ascertained by a previous trial operation.

The completion of the precipitating operation can be ascertained by taking a small sample of the fluid, filtering the same, and adding a large per centage of ammonia in solution to the same, and if the fluid does not become turbid the supply of ammonia must be continued.

In general the process will be ended when the fluid has absorbed ten to fifteen per cent. ammonia, ($NH_3$.) The precipitate must be separated from the lye in appropriate manner—for instance, by means of filter-presses with closed canals—and is then preferably washed with a ten per cent. solution of ammonia.

The ammonia-gas is produced at the beginning of the process by any known method; but during the working the ammonia can be reused by recovering the same from the waste lye, which is for this purpose warmed so that only such quantity of ammonia which is lost by becoming volatilized has to be replaced.

The mechanical devices must, as a matter of course, be so constructed and arranged that as little ammonia as possible be lost.

Instead of feeding ammonia-gas into the saccharine solution, a concentrated solution of ammonia can be added to the fluid, so that the entire mass of fluid will contain ten to fifteen per cent. ammonia; but the employment of ammonia in gas form is decidedly preferable, as a more concentrated spent lye and smaller and simpler apparatus can be employed.

Similar precipitates to those produced by employing ammonia can be obtained by using caustic potash or caustic soda in excess, but the technical application of these bases for precipitating or separating out sugar is not advantageous, as they are on the one hand too expensive and their recovery costs too much, and on the other hand the purifying of the saccharate so obtained is attended with considerable difficulties.

Having now particularly described and ascertained the nature of my invention, and in what manner the same is to be performed, I declare that what I claim is—

1. The process for precipitating or separating out sugar from saccharine fluids, (the juice of plants, molasses, sirups, spent lyes, from processes for obtaining sugar from molasses, &c.,) as lime saccharate, in such manner that ammonia in the form of gas or aqueous solution is added to a saccharine fluid previously thoroughly saturated with lime, substantially as described.

2. A novel process for precipitating or separating out sugar from saccharine fluids, as lime saccharate, by adding caustic potash to a saccharine fluid previously thoroughly saturated with lime, substantially as described.

3. A novel process for precipitating or separating out sugar from saccharine fluids, as lime saccharate, by adding caustic soda to a saccharine fluid previously thoroughly saturated with lime, substantially as described in the foregoing specification.

In witness whereof I have hereunto signed my name in the presence of two subscribing witnesses.

LOTHAR STERNBERG.

Witnesses:
ANTHONY STEFFEN,
B. ROI.